Nov. 4, 1969  J. GREEN, JR., ETAL  3,476,331
CORD STORAGE MEANS AND ELECTRICAL APPLIANCE
Filed Dec. 22, 1967

Inventors:
James Green Jr.
Max C. Hauenstein.

by *June F. Cullen*
Attorney

United States Patent Office 3,476,331
Patented Nov. 4, 1969

3,476,331
CORD STORAGE MEANS AND ELECTRICAL APPLIANCE
James Green, Jr., Spencerport, N.Y., and Max C. Hauenstein, Monroe, Conn., assignors to General Electric Company, a corporation of New York
Filed Dec. 22, 1967, Ser. No. 692,846
Int. Cl. B65h 75/34
U.S. Cl. 242—85.1                                8 Claims

ABSTRACT OF THE DISCLOSURE

The disclosure herein shows a cord-operated electrical appliance that has a housing with a supporting base and an internal chamber so formed to provide a cord storage means in and for the appliance.

BACKGROUND OF THE INVENTION

Field of the Invention

The invention herein pertains to a cord operated electric appliance and, more particularly, to a novel cord storage means easily formed within the base of the appliance and used to store and lock the cord in a shortened position.

Description of the prior art

Most electrical appliances are supplied with a cord for connection with the household current to operate the appliance. Generally, the appliance comes with a cord of about 6 to 8 feet as a result of standardization and a matter of convenience. For many counter-top appliances, such a cord length is too long and presents a problem unless there is some means of shortening the cord between the appliance and the outlet. This is true in many appliances such as blenders, coffee pots, toasters, etc., where the appliance usually remains in a fixed position close to the convenience outlet and is not moved around.

Various structures have been designed to store the excess cord and these generally are directed to various means for wrapping the excess length around a reel, either fixed or rotatable, within the appliance or the cord may merely be pushed into a chamber within the appliance. Numerous of these reels or equivalents are complex, bulky, and expensive as far as manufacturing costs are concerned.

SUMMARY OF THE INVENTION

Briefly described, the present invention is directed to a cord operated electrical appliance which generally has a housing enclosing the appliance and includes a supporting base. An annular cord storage chamber is formed in the base and opens downwardly towards the table or supporting surface. Means are provided to hold the cord in the chamber such as ears that may form an integral part of the central portion of the annulus. The cord has access to the chamber by an entrance channel from the outside of the housing which channel is directed substantialy tangent to the annular chamber and is larger in cross-section than the cross-section of the cord to permit easy entrance of the cord. A separate, peripherally spaced, cord exit channel is provided generally coplanar with and smaller than the entrance channel and the cord. The cord is pushed into and gripped in the exit channel so that it is locked in a shortened position. The cord is held in the annulus by the aforementioned ears that may extend partially over the annulus and the appliance cord, generally being a two-wire flat cord, is disposed to be squeezed into the exit channel at 90° to its angle of entrance so that the exit channel grips a portion of the cord about its narrow dimension. To insure proper holding, the gripping portion of the exit channel is at least one-third of its length from the annulus to the housing surface. The remainder of the channel may diverge from the tangent line toward the chamber or, in other words, open toward the chamber. Thus, the main object of the present invention is to provide an improved cord storage structure in an appliance where the structure may have no moving parts and is of a simple and inexpensive construction to efficiently shorten and hold the cord in the shortened position.

DESCRIPTION OF THE PREFERRED EMBODIMENT

Figure 1:
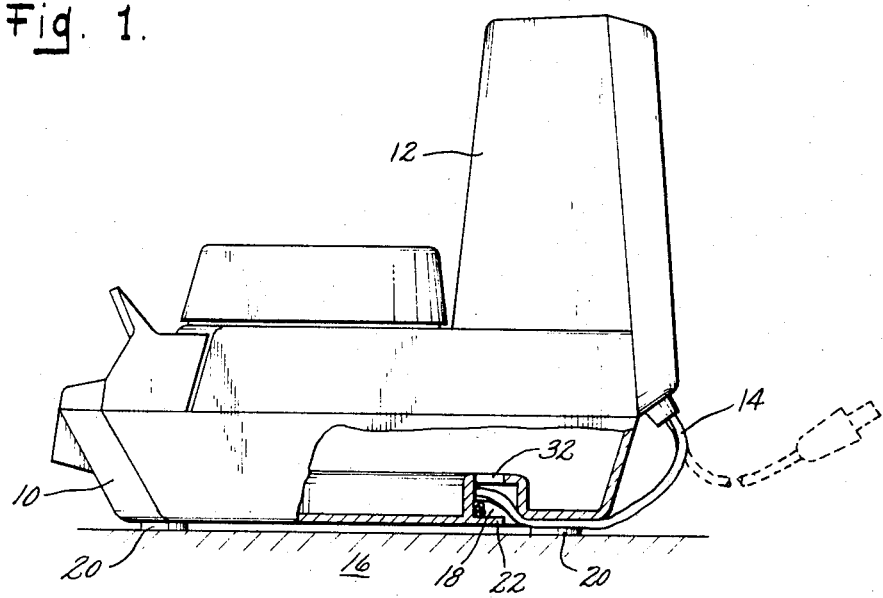
FIG. 1 is an elevational view partially broken away showing the base of an appliance such as a blender.

The cord storage means to be described herein is applicable to any appliance generally of the small type that may be mounted on a supporting surface or on the wall or any electrical appliance that is operated through a cord. For convenience, it will be described as applied to a blender but is not so limited. Referring to FIG. 1, the blender includes a supporting base 10 that fits with upper enclosing housing portion 12. From upper portion 12, which may store the electric motor, a cord 14 of the general flat two-wire appliance type, is connected to extend to a convenience outlet as indicated by the dotted portion. Suitable means for stopping and starting the appliance are provided in upper portion 12 as dictated by the particular appliance.

Figure 2:
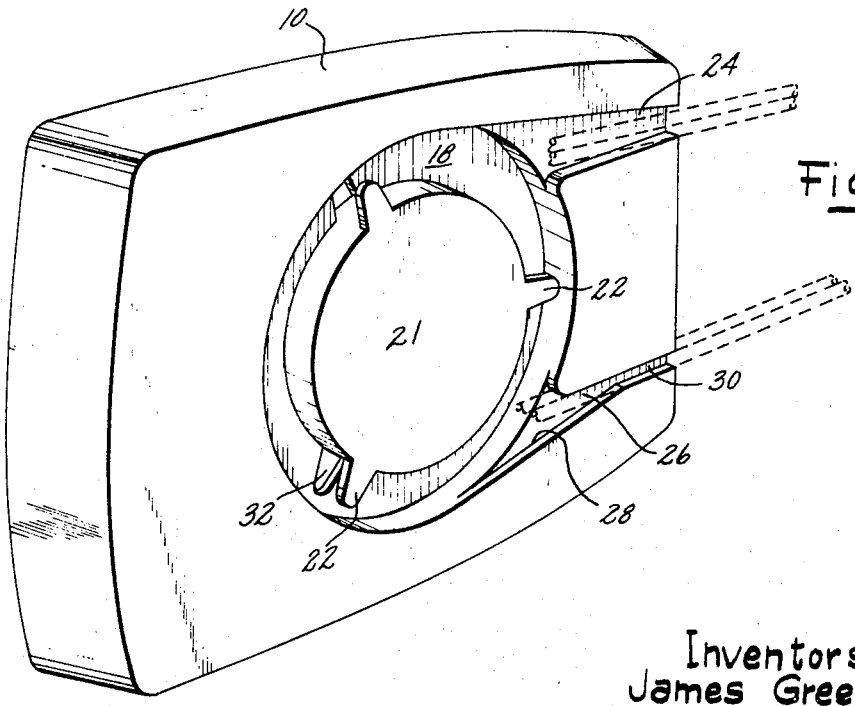
FIG. 2 is a perspective view looking in on the bottom of the structure of FIG. 1 with parts of the cord dotted.

In order to shorten cord 14 so that the appliance may assume a permanent position without excess cord lying on the supporting surface 16, the base 10 may be provided with an inwardly directed chamber 18 that may conveniently take the form of an annulus as shown in FIG. 2. This will preferably open downwardly towards the supporting surface 16 as shown in FIG. 1. Suitable means 20 form legs for supporting the appliance and may be used for a cover plate if desired.

The use of an annular chamber 18 forms a central reel 21, the annulus forming a storage chamber for excess cord. In other words, the cord is wrapped around the annulus and stored therein. Entrance to the chamber is provided by an entrance channel 24 from the outer housing surface through which the cord may be directed flat as shown dotted in FIG. 2 tangentially toward annulus 18 so no bending of the cord occurs. Channel 24 is generally wider at its narrowest point to easily accommodate the appliance cord. Exit of the cord from chamber 18 is provided by a differently formed walled tangential exit channel 26 which is generally coplanar with but smaller than the entrance channel. Additionally, exit channel 26 is smaller than the small dimension of the cord for a purpose. In order to store the excess cord in the chamber within the housing that encloses the appliance, the excess cord is fed through channel 24 and wound around the central reel portion of the annulus as needed and is then removed through the peripherally spaced smaller walled exit channel 26 where the cord is then pushed into the channel and gripped in portion 30 so that it is locked in the shortened position as shown dotted in FIG. 2. A rotating reel could be used, but is not required with the simplified construction disclosed. The cord is held in the chamber by a plurality of spaced ears 22 that may be integrally formed in the base to extend partially over the annulus as seen in FIG. 2. With the small ear clearance, the cord may be easily inserted into the annulus and wound on the reel. Generally, all appliance cord is now the two-wire flat or rip wire shown and the exit channel 26 is made preferably for use of such wire, although the old-type round wire might be similarly used. However, with the flat wire, the wire is brought out at right angles to its entrance so that the wire in the gripping portion in channel 26 is oriented substantially 90° to its entrance but has no sharp turns. In order to permit the cord to easily enter the exit channel, a diverging portion 28 may be formed to diverge from the tangent line toward the chamber as shown. A suitable length gripping walled portion 30 of at least one-third of the channel length is provided sufficient to hold the cord securely so that it is not difficult to push the cord into the gripping portion as might be the case with a full length narrow channel.

The form of cord storage means described provides for an easy one-piece molding of ABS thermoplastic or phenolic resin or of a metallic die casting. In such a simplified manufacture the entire structure may be made in one integral piece including ears 22, the die cores being removed through holes 32 which are left in the finished piece under the ears.

While the invention has been described generally in connection with a blender, it can be seen that it is applicable to any cord-operated electrical appliance whether using flat or round wire and is a simplified, easy-to-manufacture formed piece with no moving parts that, for little or no additional cost, may be formed directly in the structural member of the electrical appliance.

We claim:

1. A cord-operated electrical appliance having an enclosing housing,
   chamber means in said housing for storing said cord comprising,
   means for holding a wound cord in the chamber to shorten it, and exit walled channel means extending tangentially from and connecting said chamber and the outer surface of said housing,
   said exit channel being smaller than said cord,
   whereby the cord is pushed into and gripped in said channel to lock the cord in a shortened position.

2. Apparatus as described in claim 1 having an entrance channel means and the exit channel in substantially the same plane in said housing.

3. Apparatus as described in claim 1 wherein said housing includes a supporting base and said chamber comprises an annulus in said base.

4. Apparatus as described in claim 3 having an entrance channel larger than said cord and said smaller exit channel is coplanar with said entrance channel.

5. A cord-operated electrical appliance,
   a housing enclosing said appliance,
      said housing having a supporting base,
   an annular cord storage chamber integrally formed in said base and opening downwardly,
   means to hold said cord in the chamber,
   a cord entrance channel from the housing surface directed substantially tangent to said chamber and larger than said cord, and
   a cord exit channel to the housing surface coplanar with and smaller than said entrance channel and said cord,
   whereby the cord is pushed into and gripped in said exit channel to lock the cord in a shortened position.

6. Apparatus as described in claim 5 wherein said holding means includes plural spaced ears integrally formed in said base to extend partially over said annulus.

7. Apparatus as described in claim 6 wherein said cord is a two-wire flat cord and the angle of said cord in said entrance channel and said exit channel is at substantially 90° to each other wherein said exit channel holding said cord grips a portion of said cord about its narrow dimension.

8. Apparatus as described in claim 7 wherein the gripping portion of said exit channel is at least one third of its length from the annulus to the housing surface and the rest of the channel diverges from the tangent line toward the chamber.

References Cited

UNITED STATES PATENTS

| | | | |
|---|---|---|---|
| 1,946,128 | 2/1934 | Brosilow et al. | 242—107.2 X |
| 2,001,588 | 5/1935 | Sprague | 242—85.1 |
| 2,364,262 | 12/1944 | Wehringer | 242—85.1 |
| 2,536,776 | 1/1951 | Smellie | 242—85.1 XR |
| 2,719,702 | 10/1955 | Brace | 191—12.2 X |
| 2,779,432 | 1/1957 | Meyerhoefer | 15—323 X |
| 2,816,718 | 12/1957 | Chewning | 242—85 |
| 2,838,905 | 6/1958 | Marble | 242—85.1 X |
| 3,021,087 | 2/1962 | Rudolph | 242—85.1 |
| 3,027,115 | 3/1962 | Allen | 242—85.1 |

NATHAN L. MINTZ, Primary Examiner